United States Patent [19]
Chen et al.

[11] Patent Number: 5,755,455
[45] Date of Patent: May 26, 1998

[54] STROLLER SAFETY DEVICE

[76] Inventors: Hung-Tsun Chen, 8F-1, No. 47, Wu Chan West 4th Street, Taichung; Ming-Tsun Kan, No. 157, Lane 300, Fu Nung Street Seciton 1, Tainan, both of Taiwan

[21] Appl. No.: 845,089

[22] Filed: Apr. 21, 1997

[51] Int. Cl.[6] .................................................... B62B 7/08
[52] U.S. Cl. ............................ 280/642; 280/42; 280/647; 280/650
[58] Field of Search ................................ 280/650, 42, 644, 280/642, 647

[56] References Cited

U.S. PATENT DOCUMENTS

| | | | |
|---|---|---|---|
| 4,640,519 | 2/1987 | Bigo | 280/42 |
| 4,848,787 | 7/1989 | Kassai | 280/42 |
| 5,388,852 | 2/1995 | Bigo et al. | 280/650 |

*Primary Examiner*—David M. Mitchell
*Assistant Examiner*—Clovia Hamilton
*Attorney, Agent, or Firm*—Charles E. Baxley, Esq.

[57] ABSTRACT

A stroller includes a pair of handles and a pair of rods slidable relative to each other. A pair of casings are secured on top of the rods for slidably receiving the handles. A pair of posts each has an upper end pivotally coupled to the casing. A retainer is secured in one of the casings and has two hooks. A latch is pivotally secured in the casing for engaging with the handle and for locking the handle and the casing and includes a catch for engaging with the hooks and for allowing the handles to be moved relative to the rods. A pair of sleeves and a pair of brackets are slidably engaged on the posts respectively. A further pair of latches are pivotally coupled to the brackets for engaging with the sleeves and for securing the brackets to the sleeves and for preventing the posts from rotating toward the rods.

3 Claims, 8 Drawing Sheets

5,755,455

1
STROLLER SAFETY DEVICE

BACKGROUND OF THE INVENTION

1. Field of the Invention

The present invention relates to a stroller, and more particularly to a stroller having a safety device for preventing the stroller from folding suddenly.

2. Description of the Prior Art

Typical strollers comprise a configuration that may be opened to a working position and may be folded to a storing position. Various kinds of safety devices are provided for preventing the stroller from folding suddenly. However, once the device is released inadvertently, the stroller may also be folded suddenly.

The present invention has arisen to mitigate and/or obviate the afore-described disadvantages of the conventional strollers.

SUMMARY OF THE INVENTION

The primary objective of the present invention is to provide a stroller which includes a double security device for preventing the stroller from folding suddenly.

In accordance with one aspect of the invention, there is provided a stroller comprising a pair of handles each including a lower portion and a middle portion, a first of the handles including a first and a second projections, a pair of rods disposed parallel to the handles and each including a wheel secured to bottom and each including a casing secured on top for slidably receiving the handles and for allowing the rods to be moved relative to the handles, a pair of posts each including an upper end pivotally coupled to the casing and each including a wheel secured to bottom, at least one retainer secured in top of a first of the casings and including a first and a second hooks provided on top, a first latch pivotally secured in the first casing and including a notch for engaging with the projections of the handle, the first latch including a head for engaging between the projections and the rod for locking the handle and the casing, the first latch including a first catch for engaging with the hooks, means for biasing the notch of the first latch to engage with the projections. The head of the first latch is engaged between the first projection and the rod for preventing the first handle from moving relative to the casing, the first handle is allowed to move relative to the casing when the notch is disengaged from the first projection and when the first catch is engaged with the first hook, the first catch is adapted to engage with the second hook when the post is rotated toward the rod.

A pair of sleeves and a pair of brackets are slidably engaged on the posts respectively. A pair of bars include a middle portion pivotally coupled together and include a lower portion pivotally coupled to the posts and include an upper portion pivotally coupled to the brackets. A pair of beams include a middle portion pivotally coupled together and include a front portion pivotally coupled to the handles and include a rear portion pivotally coupled to the sleeves. The sleeves each includes a cavity. A pair of second latches are pivotally coupled to the brackets and each includes a protrusion for engaging with the cavities of the sleeves, a strap includes two ends secured to the latches for disengaging the protrusions from the cavities and for allowing the brackets to be moved relative to the sleeves.

A frame is secured to the handles, a pair of links each includes an upper end pivotally coupled to the frame, a pair of poles each includes a rear end pivotally coupled to the sleeves and each includes a front end pivotally coupled to the link.

2

The retainer includes a T-shaped bottom engaged in the post for securing the retainer in place.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 6:
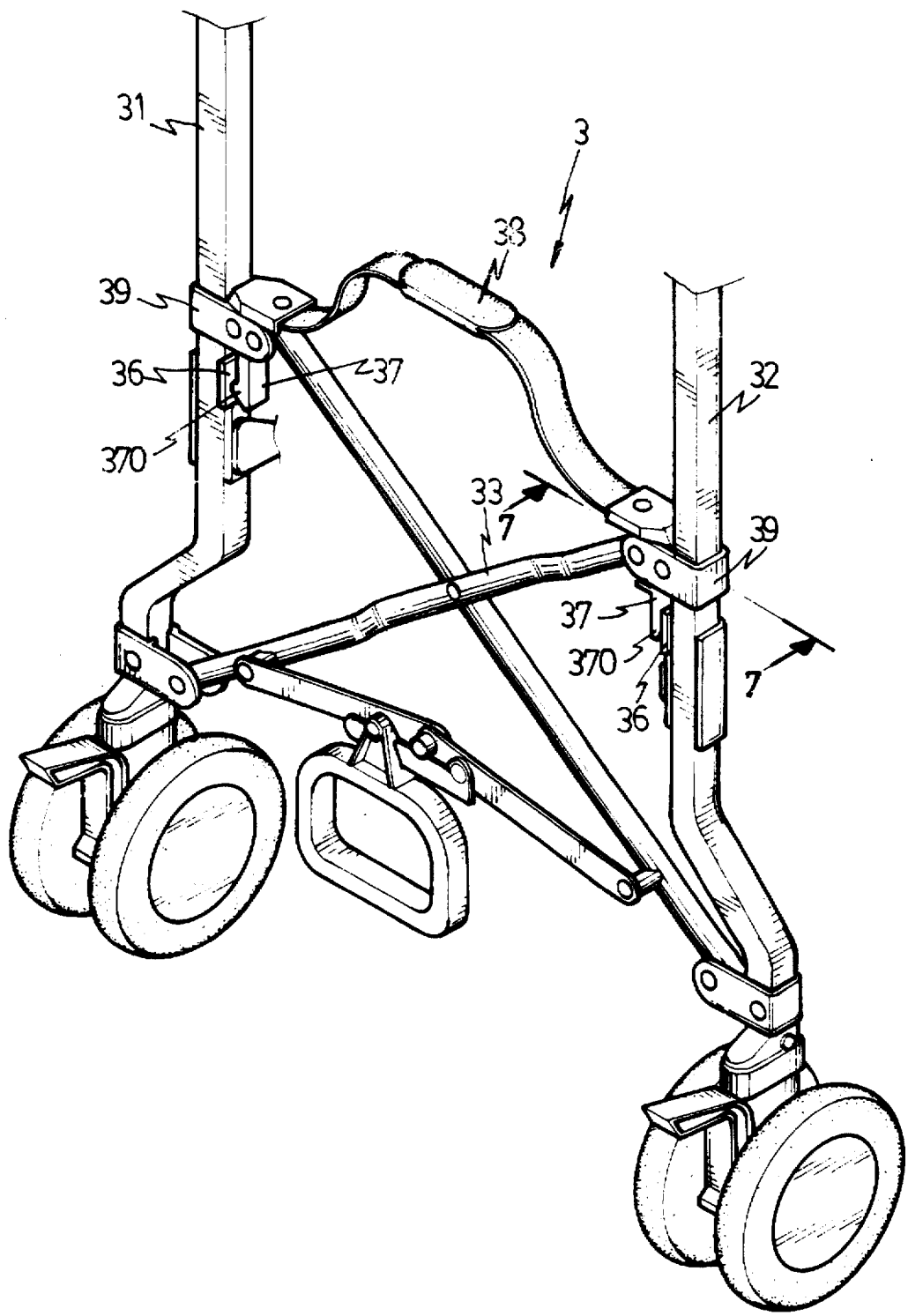
FIG. 6 is a partial perspective view showing a further safety device of the stroller.
Figure 7:
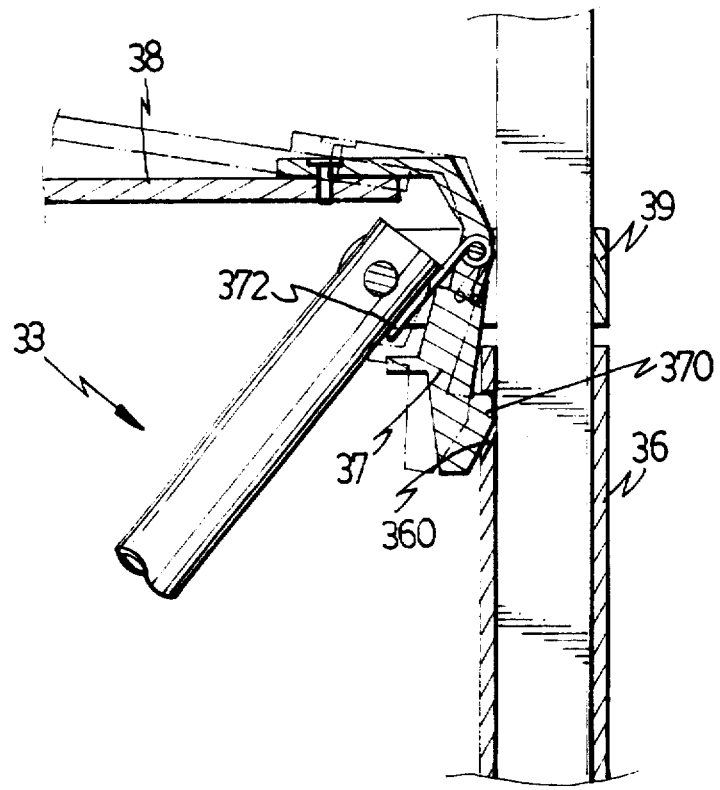
FIG. 7 is a cross sectional view taken along lines 7—7 of FIG. 6.
Figure 8:
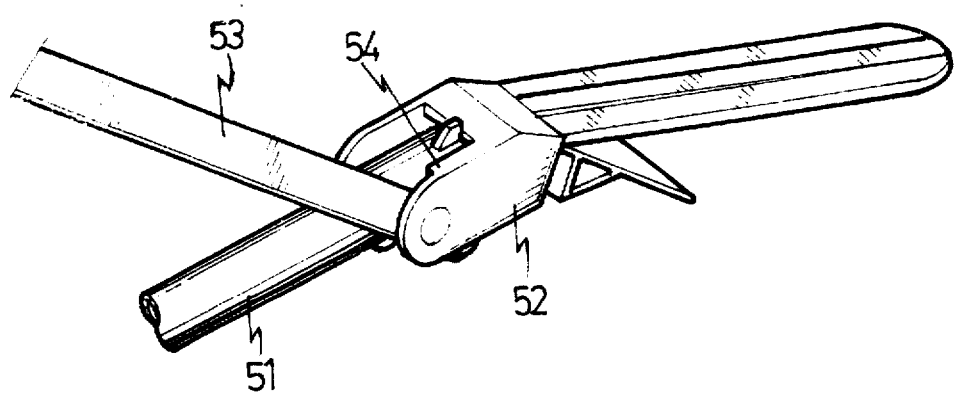
FIG. 8 is a partial perspective view showing a another safety device of the stroller.

Referring to the drawings, and initially to FIGS. 1–5, a stroller in accordance with the present invention comprises a pair of handles 11, 12 each having a hand grip 13, 14 provided on top and each having a block 123 secured to the bottom. A pair of rods 122 are disposed parallel to the handles 11, 12 and each includes a casing 2 secured on top and each includes a wheel 16, 17 secured to the bottom. The handles 11, 12 are slidably engaged in the casings 2 (FIGS. 2–5) and the rods 122 are slidably engaged in the blocks 123 such that the handles 11, 12 may be moved or slided longitudinally relative to the rods 122. A U-shaped frame 15 is secured to the middle portion of the handles 11, 12. A pair of posts 31, 32 each has an upper end pivotally coupled to the casing 2 at a pin 222 (FIG. 2) and each has a wheel 34, 35 provided on the bottom. A pair of sleeves 36 and a pair of brackets 39 are slidably engaged on the posts 31, 32 respectively. A pair of bars 33 have a middle portion pivotally coupled together and have a lower portion pivotally coupled to the bottom portions of the posts 31, 32 and have an upper portion pivotally coupled to the brackets 39 (FIGS. 6, 7). A pair of beams 41, 42 have a middle portion pivotally coupled together and have a front portion pivotally coupled to the bottom portions of the handles 12 and have a rear portion pivotally coupled to the sleeves 36. A pair of links 53 each has an upper end pivotally coupled to the frame 15. A pair of poles 51 each has a rear end pivotally coupled to the sleeves 36 and a front end pivotally coupled to the bottom end of the link 53 by a coupler 52 (FIG. 8). The couplers 52 each includes a shoulder 54 for engaging with the link 53 and for limiting the rotational movement of the link 53 relative to the poles 51.

Figure 2:
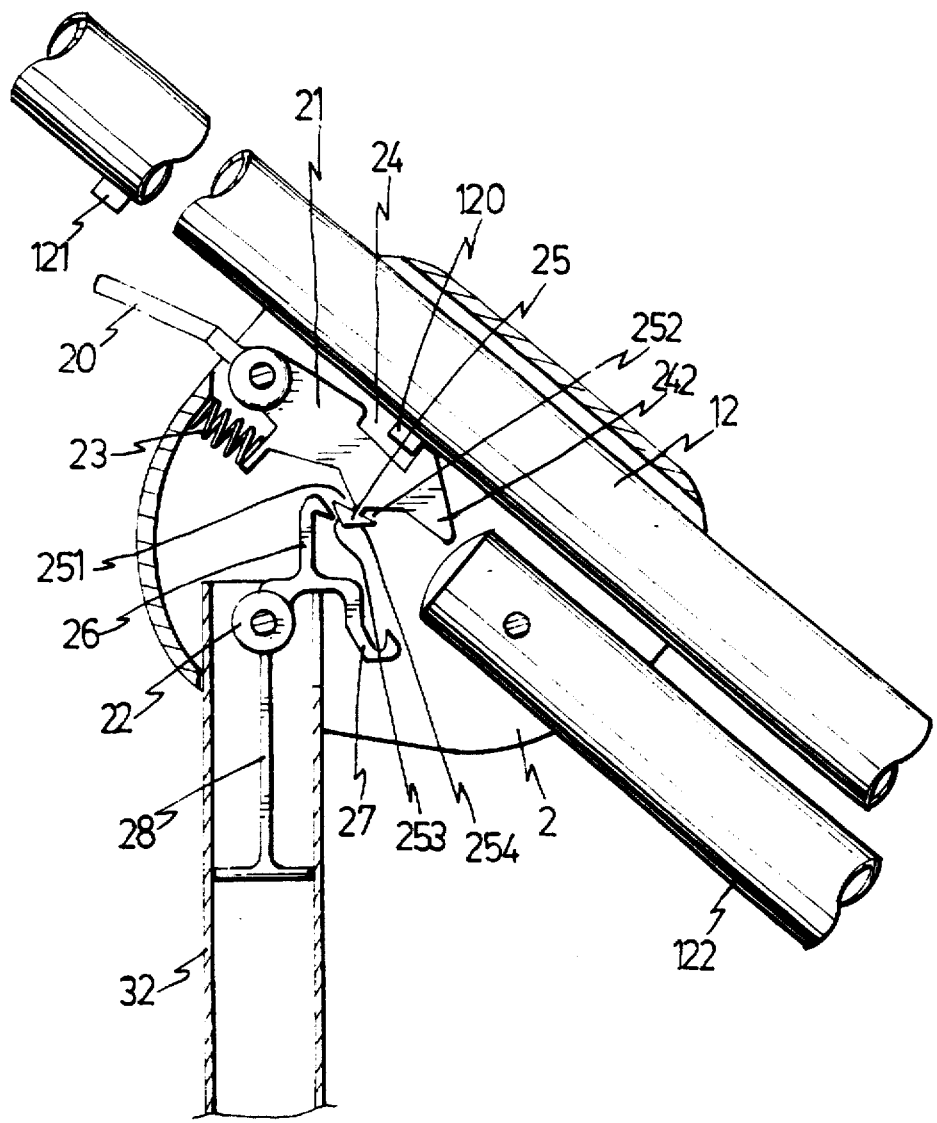
FIGS. 2, 3, 4, 5 are schematic views illustrating the operation of the stroller.
Figure 3:
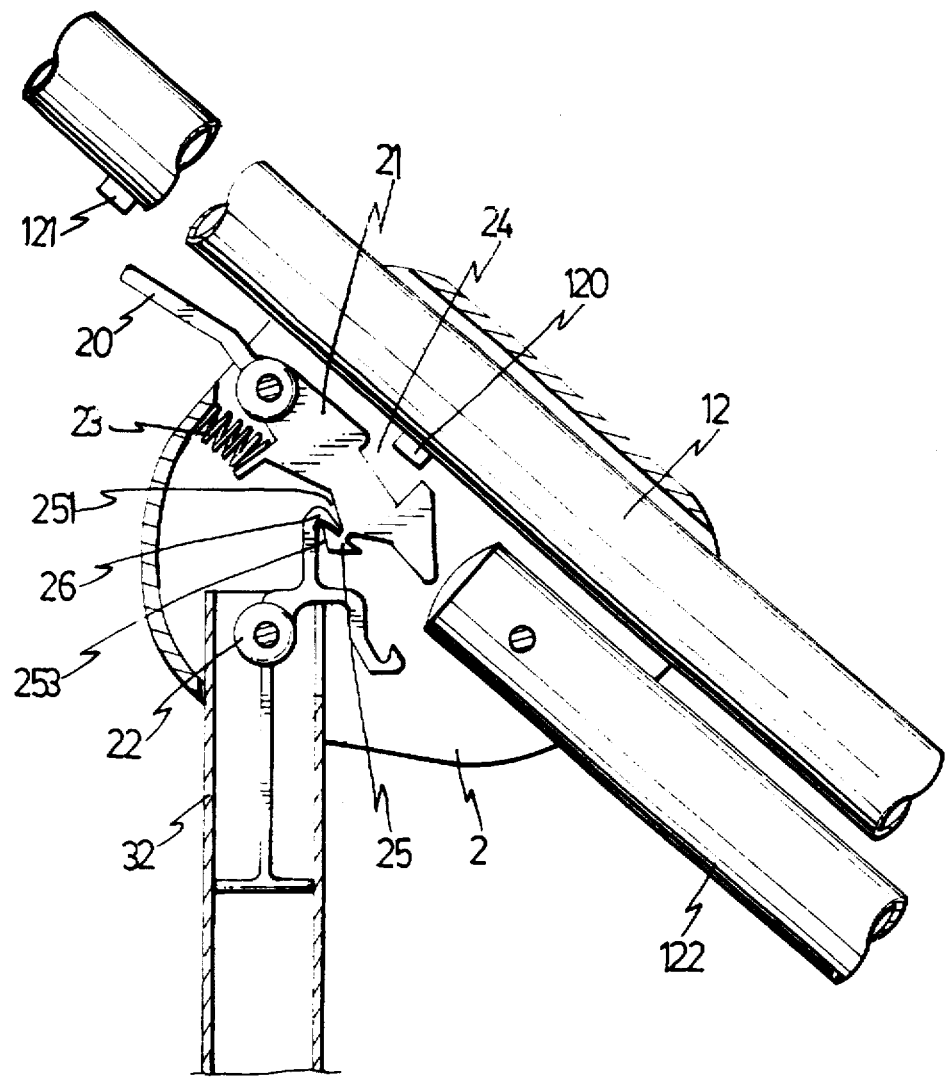

As shown in FIGS. 2 and 3, a retainer 22 is secured in top of one the casings 2 by the pin 222 and includes a T-shaped bottom 28 engaged in the post 32 for securing the retainer 22 in place. The retainer 22 includes two hooks 26, 27 provided on top. A latch 21 is pivotally secured in the casing 2 and includes a hand grip 20 for rotating the latch 21 and includes a notch 24 for engaging with either of two projections 120, 121 of the handle 12. The latch 21 includes a head 242 for engaging between the respective projection 120, 121 and the top of the rod 122 (FIGS. 2, 4) and for locking purposes. A spring 23 may bias the notch 24 of the latch 21 to engage with either of the projections 120, 121. The latch 21 includes a catch 25 having two tapered surfaces 253, 254 for engaging with the hooks 26, 27 and having two depressions 251, 252 for engaging with the hooks 26, 27. The casings 2 may both include a latch 21 and a retainer secured therein.

As shown in FIGS. 6 and 7, the sleeves 36 each includes a cavity 360. A pair of latches 37 are pivotally coupled to the brackets 39 and each includes a protrusion 370 biased to engage with the cavities 360 of the sleeves 36 by springs 372. A strap 38 has two ends secured to the top of the latches 37 for disengaging the protrusions 370 from the cavities 360 and for allowing the brackets 39 to be moved relative to the sleeves 36.

Figure 1:
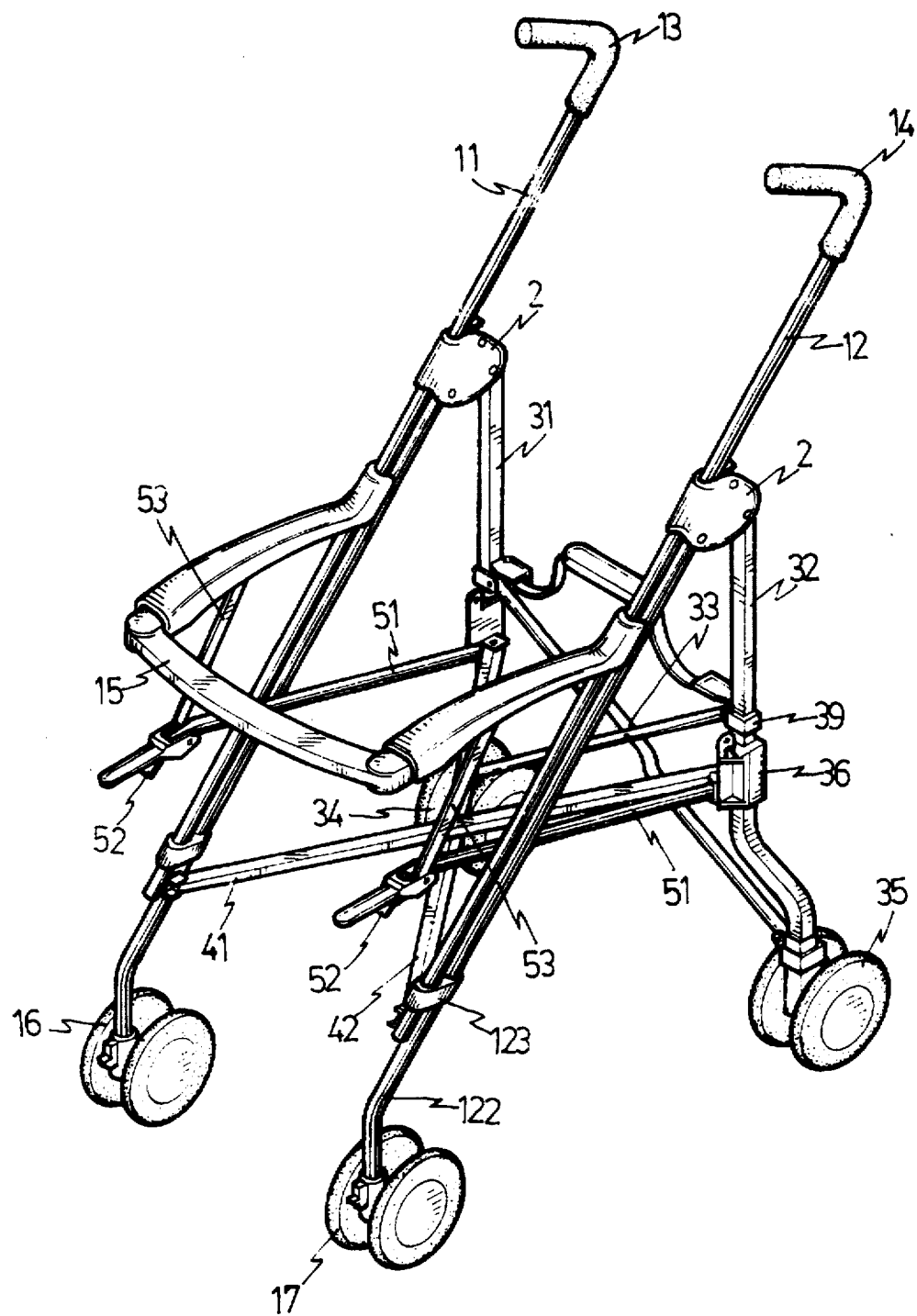
FIG. 1 is a perspective view of a stroller in accordance with the present invention.

In operation, as shown in FIGS. 1–3, when the posts 31, 32 are rotated away from the rods 122 to the open position (FIGS. 1–3), the head 242 of the latch 21 is engaged between the projection 120 and the top of the rod 122 such that the handle 12 may not move downward relative to the rod 122 and the casing 2. At this moment, as shown in FIGS. 6 and 7, the protrusions 370 of the latches 37 are engaged with the cavities 360 of the sleeves 36 such that the brackets 39 are prevented from moving relative to the sleeves 36 and such that the stroller includes a double security device.

Figure 4:
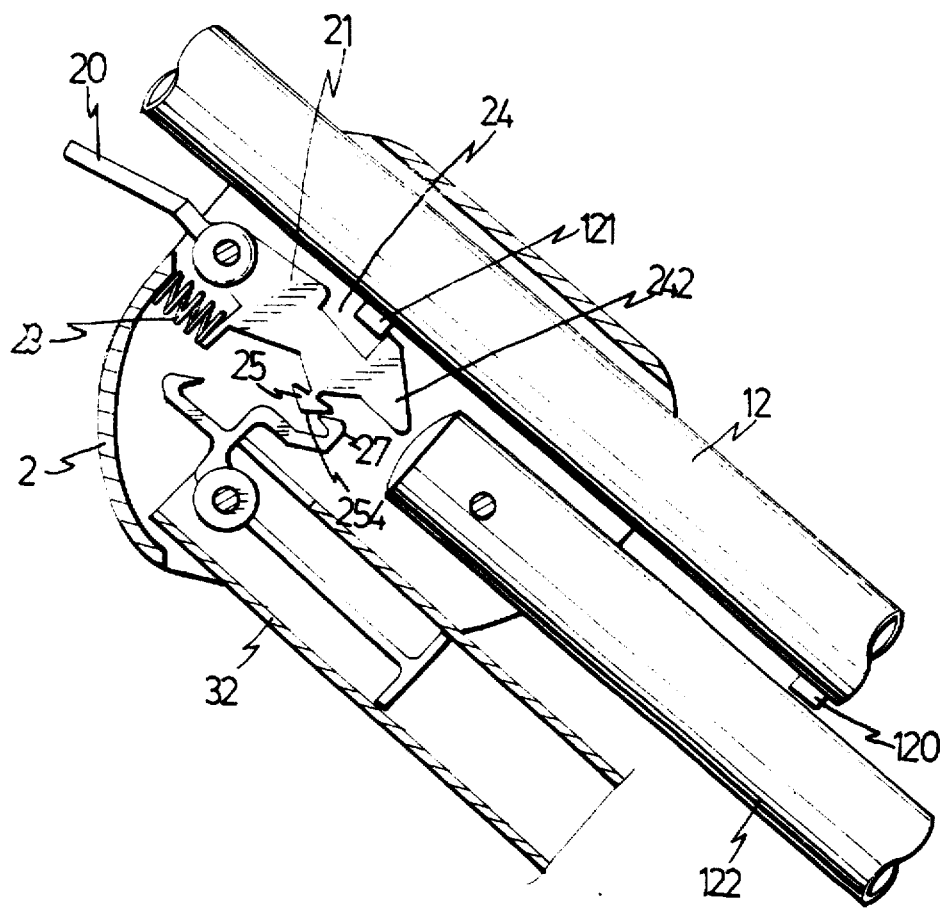
Figure 5:
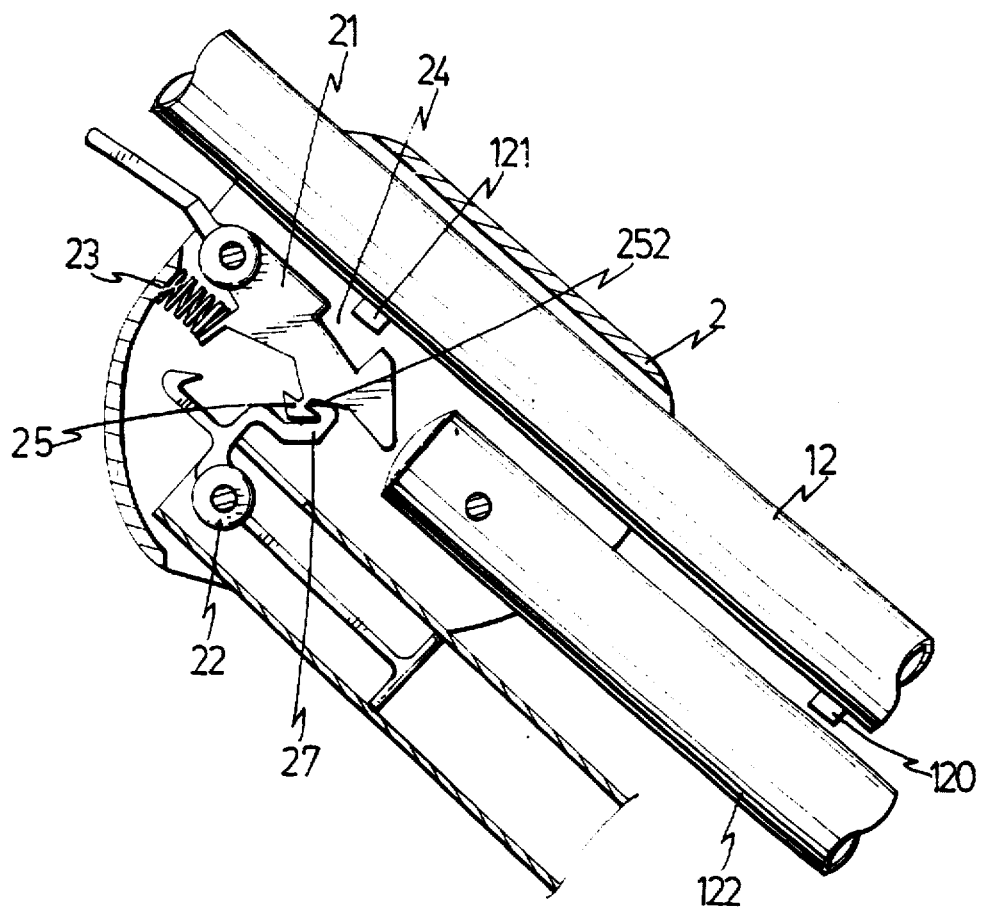

As shown in FIG. 3, when the notch 24 of the latch 21 is disengaged from the projection 120 against the spring 23 by the hand grip 20, the catch 25 may engage with the hook 26 by the tapered surface 253 such that the handle 12 may be moved relative to the casing 2. At this moment, as shown in FIGS. 6 and 7, the strap 38 should be pulled upward for disengaging the protrusions 370 of the latches 37 from the cavities 360 of the sleeves 36 such that the brackets 39 may be moved relative to the sleeves 36 and such that the bars 33 may be folded. As shown in FIG. 1, the posts 32 may be rotated to the position parallel to and adjacent to the rods 122 and the handles 12 may move downward relative to the casings 2 to the folded position until the other projection 121 is engaged with the notch 24 of the latch 21 (FIG. 4). As shown in FIGS. 3 and 4, the catch 25 may be disengaged from the hook 26 automatically when the post 32 is rotated toward the rod 122. As shown in FIG. 4, when in the folded position, the head 242 of the latch 21 may also be engaged between the projection 121 and the top of the rod 122 so as to prevent the handle 12 from moving relative to the rod 122. When the notch 24 of the latch 21 is disengaged from the projection 121 against the spring 23 by the hand grip 20, the catch 25 may engage with the hook 27 by the tapered surface 254 such that the handle 12 may be moved relative to the casing 2 to the open and working position.

Accordingly, the stroller in accordance with the present invention includes a double security device for preventing the stroller from folding suddenly.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A stroller comprising:
   - a pair of handles each including a lower portion and a middle portion, a first of said handles including a first and a second projections,
   - a pair of rods disposed parallel to said handles and each including a wheel secured to bottom and each including a casing secured on top for slidably receiving said handles and for allowing said rods to be moved relative to said handles,
   - a pair of posts each including an upper end pivotally coupled to said casing and each including a wheel secured to bottom,
   - at least one retainer secured at the upper end of said post within said casing and including first and second hooks,
   - a first latch pivotally secured in said first casing and including a notch for engaging with said projections of said handle, said first latch including a head, said first latch including a first catch for engaging with said hooks,
   - means for biasing said notch of said first latch to engage with said projections,
   - said head of said first latch being engaged between said first projection and said casing for preventing said first handle from moving relative to said casing, said first handle being allowed to move relative to said casing when said notch is disengaged from said first projection and when said first catch is engaged with said first hook, said first catch being adapted to engage with said second hook when said post is rotated toward said rod.

2. A stroller according to claim 1 further comprising a pair of sleeves and a pair of brackets slidably engaged on said posts respectively, a pair of bars each including a middle portion pivotally coupled together and each including a lower portion pivotally coupled to said posts and including an upper portion pivotally coupled to said brackets, a pair of beams including a middle portion pivotally coupled together and including a front portion pivotally counted to said handles and including a rear portion pivotally coupled to said sleeves, said sleeves each including a cavity, a pair of second latches, said second latches each pivotally coupled to each of said brackets and each including a protrusion for engaging with said cavities of said sleeves, a strap including two ends secured to said latches for disengaging said protrusions from said cavities and for allowing said brackets to be moved relative to said sleeves.

3. A stroller according to claim 2 further comprising a frame secured to said handles, a pair of links each including an upper end pivotally coupled to said frame, a pair of poles each including a rear end pivotally coupled to said sleeves and each including a front end pivotally coupled to said link.

* * * * *